No. 661,945. Patented Nov. 20, 1900.
J. W. BERRY.
AUTOMATIC WEIGHING MACHINE.
(Application filed Feb. 27, 1900.)
(No Model.) 2 Sheets—Sheet 1.

WITNESSES
G. W. Bullard.
L. A. Nicholson

INVENTOR
Jno. W. Berry
Franklin H. Hough
Attorney

No. 661,945. Patented Nov. 20, 1900.
J. W. BERRY.
AUTOMATIC WEIGHING MACHINE.
(Application filed Feb. 27, 1900.)
(No Model.) 2 Sheets—Sheet 2.

WITNESSES
G. W. Bullard
L. A. Nicholson

INVENTOR
Jno. W. Berry
Franklin H. Hough
Attorneys

THE NORRIS PETERS CO., PHOTO-LITHO., WASHINGTON, D. C.

UNITED STATES PATENT OFFICE.

JOHN W. BERRY, OF TACOMA, WASHINGTON.

AUTOMATIC WEIGHING-MACHINE.

SPECIFICATION forming part of Letters Patent No. 661,945, dated November 20, 1900.

Application filed February 27, 1900. Serial No. 6,703. (No model.)

*To all whom it may concern:*

Be it known that I, JOHN W. BERRY, a citizen of the United States, residing at Tacoma, in the county of Pierce and State of Washington, have invented a new and useful Automatic Weighing-Machine, of which the following is a specification.

My invention pertains to devices for weighing articles of merchandise—such as flour, grain, sugar, coal, or other substances—in equal quantities for sacking or packing in cases or packages preparatory for trade and commerce.

The object of my invention is to provide a means for weighing such articles automatically without the use of an operator at the scales and to do so more rapidly, uniformly, and accurately than can be done by the most skilful operator.

I attain this object by means of the device illustrated in the accompanying drawings, in which—

Figures 1, 2:
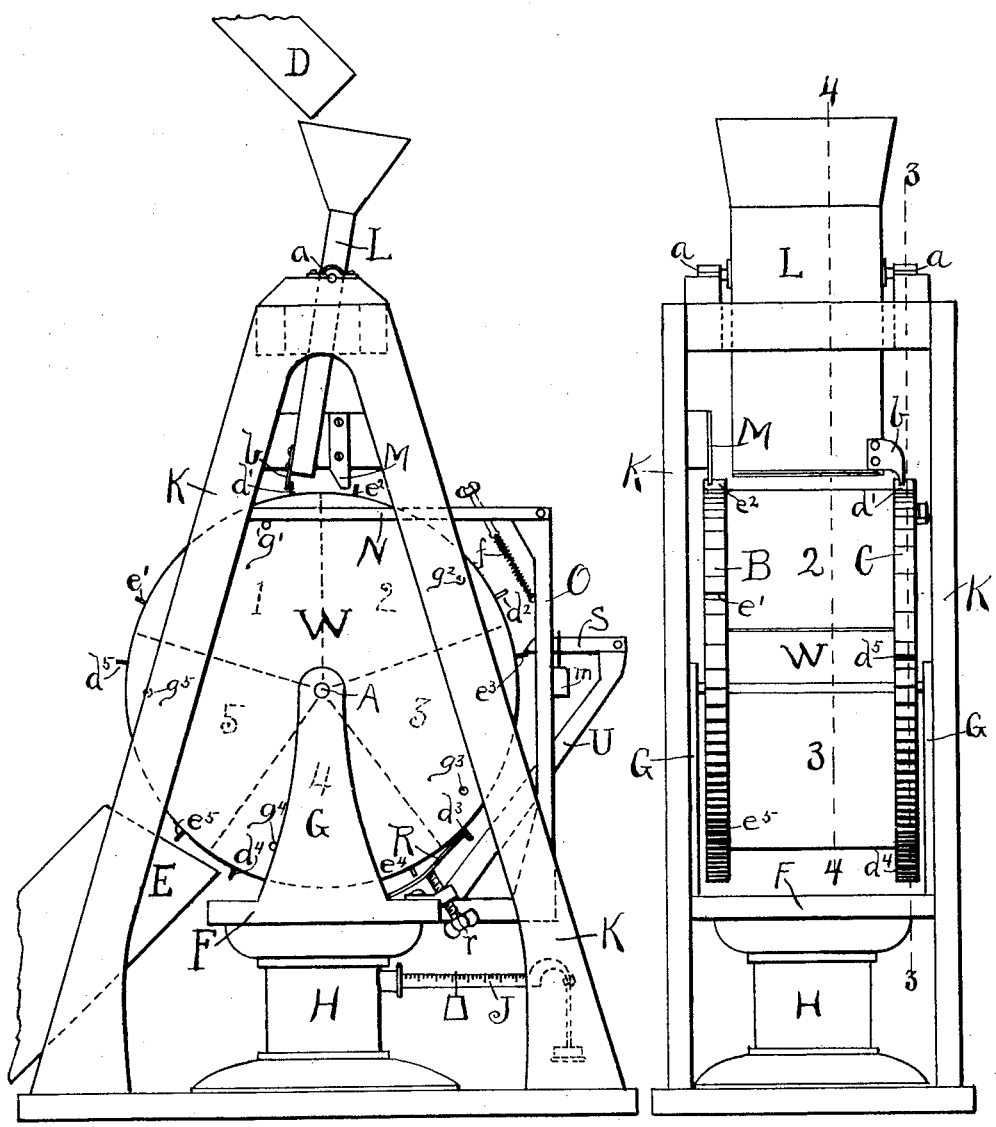
Figure 3:
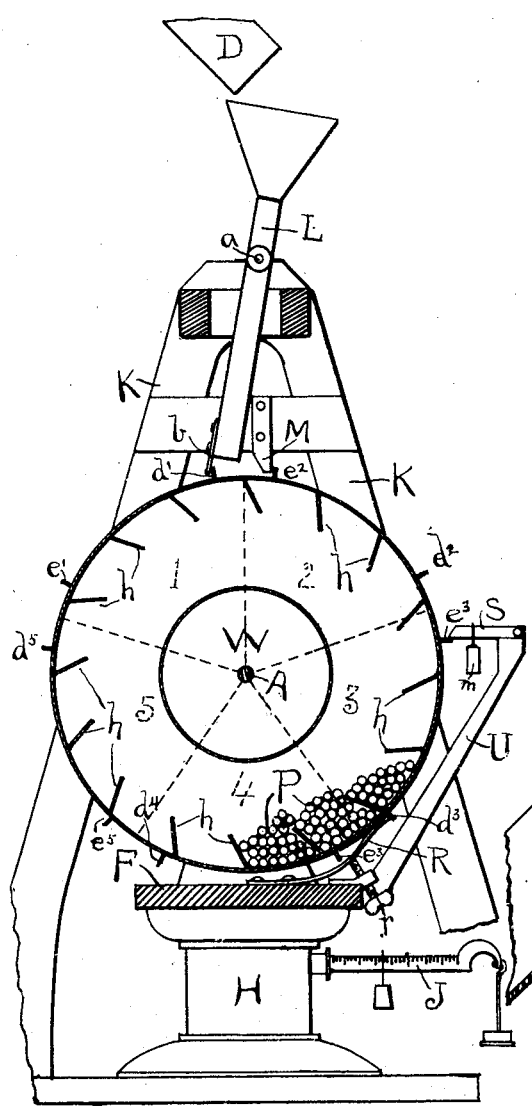
Figure 4:
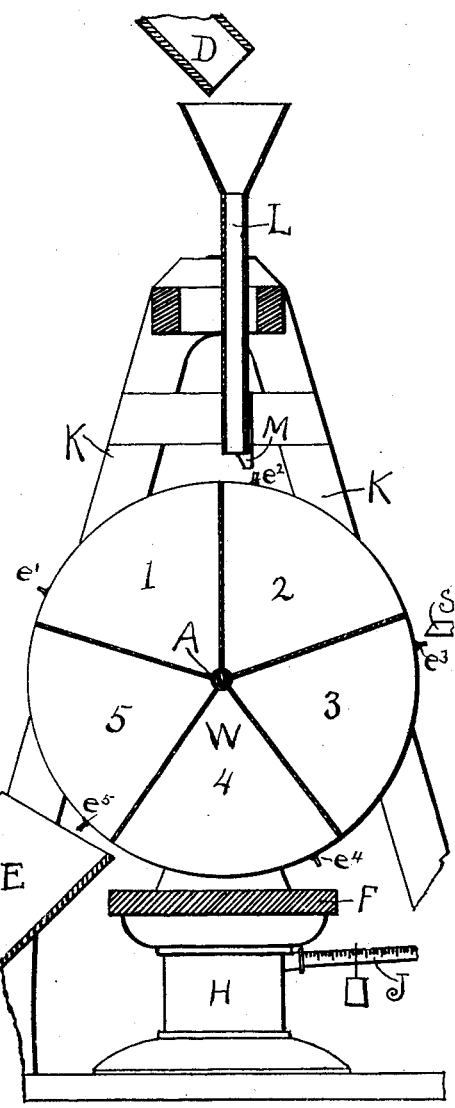

Figure 1 is a side view or elevation of my invention. Fig. 2 is a left front view of the same. Fig. 3 is a vertical section at 3 3 looking to the left and shows the interior mechanism of the hollow wheels of the invention. Fig. 4 is a vertical section at 4 4 looking to the left and exhibits the weighing-buckets, the supply and discharge chutes, and a part of the operating mechanism.

Similar characters refer to similar parts in the several views.

My invention comprises a wide wheel W, mounted on an axis A, so as to revolve with ease. This wheel is divided into a number, preferably five, of triangular-shaped apartments or buckets 1, 2, 3, 4, and 5. The webs or partitions between the buckets are made of strong thin material, preferably sheet metal, and the sides B and C of the wheel inclosing the buckets are made of similar materials and are hollow. These hollow sides of the weighing-wheel comprise an essential novelty of my invention.

The buckets of the wheel are designed to receive the substance to be weighed, one bucket being filled at a time. As soon as one bucket, as No. 1, has received the desired weight of material from the supply-chute D it turns automatically and dumps its contents into the discharge-chute E, and bucket No. 2 is moved forward to be filled with an equal weight of material. The wheel is thus kept revolving and rapidly and accurately weighs an equal amount in each bucket.

The weighing-wheel is mounted on a platform F between two upright pivot-arms G G, attached thereto. This platform is placed upon weighing-scales H and the scales balanced. The scale-beam is then set to the desired weight, and with the wheel in adjustment it is ready to receive the material to be weighed.

The scales, with the wheel, are placed on a floor, substantial table, or platform. A substantial frame K K, attached to the table, is set up about the scales to support the automatic swinging feed-chute L directly over and at a proper height above the weighing-wheel. This chute L is pivotally mounted at $a$ and is provided with a small projecting arm $b$ on one side of the lower end. This arm is designed to engage the projecting lugs or teeth $d'$ $d^2$ $d^3$ $d^4$ $d^5$ on the rim of the right side of the wheel, each lug thus holding the chute over its adjacent bucket till the required weight of substance is deposited therein. On the opposite side of the frame is a fixed stop-arm M, that is designed to engage lugs $e'$ $e^2$ $e^3$ $e^4$ $e^5$ on the rim of the left side of the wheel. This stop-arm prevents the wheel W from dumping until each bucket receives the required weight of the material that is being weighed. As soon as a bucket, as No. 1, receives sufficient material to tip the scales the wheel is lowered a short space with the downward motion of the scale-platform. This frees the projecting arm $b$ from its engagement with $d'$, and immediately the chute L swings backward over bucket No. 2 and begins to fill the same. The lug $e'$ is set free from M simultaneously with $d'$ from $b$, and the loaded bucket No. 1 turns the wheel toward the discharge-chute E and empties itself therein. The wheel is lightened as soon as the bucket begins to discharge into E, and the scale-beam J at once drops down and lifts the platform and wheel back to their former height. The lug $d^2$ now engages $b$ and carries chute L forward, with bucket No. 2, while M engages $e^3$ and prevents the wheel from turning till bucket No. 2 receives the required amount of material to tip the scales, when it dumps into E, and bucket No. 3 moves into position to be filled. In this way the wheel is made to revolve automatically as each bucket is filled with an equal weight of substance from the supply-chute D.

In the operation of the wheel it is necessary to guard against the momentum of the wheel caused by the force of the full bucket in its movement toward E. This is done by means of a brake-beam N, with an adjustable spring $f$ supported from the platform F by the upright O. This brake-beam rides on the pegs $g'$ $g^2$ $g^3$ $g^4$ $g^5$, projecting from the side of C, and prevents the wheel W from stopping with a jolt. It is also necessary to hold the weighing-wheel as nearly in equilibrium as possible while each bucket is being filled. I accomplish this by means of the hollow sides B and C of the revolving bucket-wheel. The construction of the interior of these hollow sides is shown in Fig. 3. The outer part of the inner space in each is divided into a number of spaces or buckets by means of web-pieces $h$ $h$ $h$, set in radially or to an incline, if found more suitable. A sufficient amount of liquid, sand, shot, metal balls, or other voluble substance to nearly counterbalance a loaded bucket is then put in, as seen at P. The voluble substance will also help to guard against momentum. Its weight will give a backward tendency to the wheel while each bucket begins to fill and cause the lug $d^3$ to rest back against the spring R, and the lug $e^2$ will not come in contact with M with sufficient force to cause perceptible friction until a bucket is full. In fact, it is designed that but a very slight pressure will rest against M at the time the loaded bucket tips the wheel down. The equilibrium is still further preserved and is adjusted by means of the weighted lever S, supported on the arm U. This lever at its point engages one of the lugs, as $e^3$, and by means of the swinging weight $m$ may be so exactly adjusted as to be lifted by the weight of the loaded bucket just prior to its being filled to the required weight.

With the several parts constructed and put in proper adjustment as above described my machine will work without friction, jar, or jolt and each bucket will receive and deliver a quantity that in weight is exact to a nicety.

In Fig. 3 the wheel is shown in position as it appears just prior to tipping the scales, and Fig. 4 shows the position on tipping the scales when $b$ and M clear the lugs $d$ and $e$ on the rim of the wheel.

It is to be observed that the spring R is adjustable by means of the screw $r$ and that this spring also serves as a brake as it rides over the lugs $d$. Also note the beams N and S are self-supporting by means of the shoulder on the top of their upright supports.

In the construction of my machine I am not limited to dimensions; but the size and proportions may be varied, so as to provide a machine that will weigh small or large quantities and light or heavy substances.

Having now described my invention, what I claim as new, and desire to secure by Letters Patent, is—

1. An automatic weighing-machine comprising a wheel, said wheel having a plurality of triangular-shaped buckets constructed radially from the axle, and between hollow side wheels, said hollow wheels provided internally with suitable buckets and voluble substances, to counterbalance a partially-loaded bucket of said machine, and means for automatically freeing and governing the motion of said wheel when mounted on scales and set in motion by a load that will tip the beam of said scales, substantially as set forth and described.

2. An adjustable attachment to any scale for weighing automatically comprising a number of radiating buckets mounted between hollow wheels, an automatic swinging chute, said chute so mounted as to supply a fixed weight of substance into each bucket, the hollow wheels counterbalanced with a voluble substance, a spring to resist a backward motion, a brake to control the momentum, and an adjustable counterweight, substantially as described and for the purposes set forth.

In testimony whereof I affix my signature in the presence of two witnesses.

JNO. W. BERRY.

Witnesses:
A. N. FITCH,
JAMES M. HARRIS.